United States Patent [19]

Griffith

[11] 4,352,188
[45] Sep. 28, 1982

[54] RF PUMPED WAVEGUIDE LASER WITH INDUCTIVE LOADING FOR ENHANCING DISCHARGE UNIFORMITY

[75] Inventor: Glen A. Griffith, Redondo Beach, Calif.

[73] Assignee: Hughes Aircraft Company, Culver City, Calif.

[21] Appl. No.: 165,524

[22] Filed: Jul. 3, 1980

[51] Int. Cl.³ .............................................. H01S 3/093
[52] U.S. Cl. .......................................... 372/82; 372/29
[58] Field of Search .................. 331/94.5 PE, 94.5 G; 350/96.14

[56] References Cited

U.S. PATENT DOCUMENTS 4,169,251 9/1979 Laakmann ..................... 331/94.5 G

OTHER PUBLICATIONS

"High Power, Subnanosecond Pulse From a TEA Nitrogen Laser with Traveling Wave Excitation", Salzmann et al., Oiot. Comm. vol. 12, No. 4, p. 370, Dec. 1974.

"Folded Parallel Plate $N_2$ Laser", Loy et al., IBM Tech. Discl. Bull., vol. 18, No. 3, (Aug. 1975), p. 950.

Primary Examiner—William L. Sikes
Assistant Examiner—Léon Scott, Jr.
Attorney, Agent, or Firm—Robert M. Wallace; William H. MacAllister; Paul Coble

[57] ABSTRACT

A discharge-excited waveguide gas laser is disclosed utilizing a transverse rf excitation voltage at a frequency of at least about 30 MHz applied between elongated electrodes on opposite sides of the laser discharge chamber. A plurality of shunt inductances are coupled between the electrodes externally of the chamber at periodically spaced locations along the length of the chamber. These inductances provide a negative admittance which compensates for the variation in the phase angle of the transmission line reflection coefficient along the length of the laser discharge chamber. The variation in the magnitude of the standing wave voltage produced in the chamber by the excitation voltage is reduced accordingly, thereby improving the uniformity of the laser-exciting discharge.

5 Claims, 4 Drawing Figures

RF PUMPED WAVEGUIDE LASER WITH INDUCTIVE LOADING FOR ENHANCING DISCHARGE UNIFORMITY

BACKGROUND OF THE INVENTION

1. Field of the Invention

This invention relates to lasers, and more particularly it relates to waveguide gas lasers excited with a transverse rf discharge.

2. Description of the Prior Art

A recent advance in the waveguide gas laser art involves pumping the laser by means of a transverse discharge at rf frequencies generally in the vhf-uhf range. Lasers of this type are disclosed in U.S. Pat. No. 4,169,251, issued Sept. 25, 1979 to K. D. Laakmann and assigned to the assignee of the present invention.

It is often desirable to increase the power output of a laser by increasing the length of the laser, and for ac pumped lasers, it is sometimes advantageous to increase the excitation frequency. Since the electrical length of a laser is proportional to the product of the excitation frequency and the physical length of the laser, increasing either the physical length or the excitation frequency, or both, results in a laser of longer electrical length. In the case of a transverse rf discharge-excited waveguide laser, if the electrical length is increased sufficiently, transmission line effects occur which degrade the discharge uniformity, thereby reducing operating efficiency and the obtainable output power.

SUMMARY OF THE INVENTION

It is an object of the present invention to provide a transverse rf discharge-excited waveguide laser capable of operating efficiency with longer physical lengths or higher excitation frequencies, or both, than heretofore has been achieved.

It is a further object of the invention to provide a transverse rf discharge-excited waveguide laser of increased electrical length which utilizes only a single electrical feed and requires minimum additional circuitry.

In a waveguide laser according to the invention a laser gas is contained in an elongated chamber of cross-sectional dimensions suitable for guiding laser light and including a pair of elongated electrodes disposed parallel to one another on opposite sides of the chamber. An alternating excitation voltage at a frequency of not less than about 30 MHz is applied between the electrodes to establish a laser-exciting discharge in the laser gas. By providing appropriate shunt inductance between the electrodes externally of chamber, the variation in the magnitude of the standing wave voltage produced in the chamber by the excitation voltage is reduced, thereby improving the uniformity of the laser-exciting discharge.

Additional objects, advantages, and characteristic features of the invention will become readily apparent from the following detailed description of a preferred embodiment of the invention when considered in conjunction with the accompanying drawings.

DETAILED DESCRIPTION OF THE INVENTION

Figure 1:
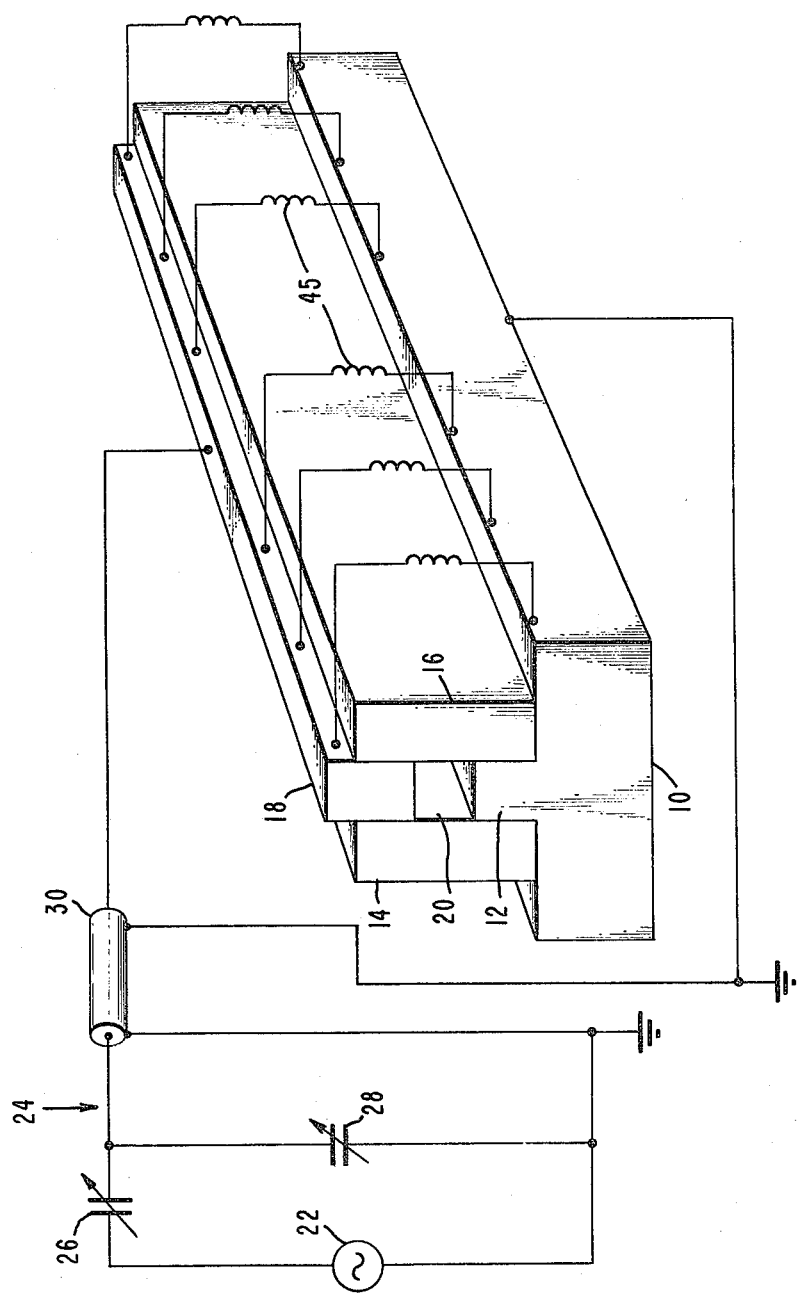
FIG. 1 is a perspective view, partly in schematic circuit form, illustrating a waveguide laser according to the invention.

Referring to FIG. 1 with greater particularity, a waveguide laser according to the invention may be seen to include an elongated base member 10 of an electrically conductive material and defining an upwardly extending longitudinal ridge portion 12 of rectangular cross-section. Mounted on the base member 10 adjacent to the respective side surfaces of the ridge portion 12 are a pair of elongated dielectric side members 14 and 16 having a rectangular cross-section and a height substantially greater than that of the ridge portion 12. An elongated electrically conductive member 18 of rectangular cross-section is mounted between the side members 14 and 16 at a location spaced from the ridge portion 12 so that the inner surfaces of the members 12, 14, 16, and 18 define an elongated chamber 20 wherein a laser-exciting discharge is generated between facing surfaces of member 18 and ridge portion 12.

It is pointed out that although the laser discharge chamber 20 is illustrated as having a rectangular cross-section, other cross-sectional configurations, such as circular, may be employed instead. The cross-sectional dimensions of the chamber 20 should be suitable for guiding laser light, typically ranging from about 0.25 mm$^2$ to about 7.5 mm$^2$. As a specific example for illustrative purposes, the chamber 20 may have a square cross-section 1.5 mm on each side and a length of about 21.6 cm.

The electrically conductive members 10 and 18 may be of a metal such as aluminum, although other electrically conductive materials are also suitable and may be employed instead. A preferred dielectric material for the side members 14 and 16 is alumina, although other materials such as beryllia or glass also may be used. The dielectric members 14 and 16 may be secured to the electrically conductive members 10 and 18 either mechanically or by a suitable bonding material.

The discharge chamber 20 is filled with a desired laser gas which may be either static or flowing. As a specific example for illustrative purposes, the laser gas may be a mixture of helium, nitrogen, and carbon dioxide in a volume ratio of approximately 3:1:1, although it should be understood that other laser gases and gas mixture ratios may be employed instead. For example, in order to lower the ionization potential of the laser gas a small amount of xenon may be added. Typical laser gas pressures may range from about 20 Torr to about 1000 Torr. In a specific exemplary laser which has been constructed according to the invention the aforementioned exemplary gas mixture of helium, nitrogen, and carbon dioxide was employed at a pressure of 75 Torr along with 10 Torr of xenon.

In order to contain the laser gas mixture within the chamber 20, the ends of the chamber 20 may be sealed with suitable windows or mirrors (not shown); or, alternatively, the ends of the chamber 20 may be left open as shown in FIG. 1 and the assembly of members 10, 14, 16 and 18 enclosed within a suitable housing which contains the laser gas. When a laser according to the invention is to be operated as an oscillator, a pair of aligned reflectors (not shown), one of which is made partially transmissive, would be disposed at or beyond opposite ends of the chamber 20 along the longitudinal axis thereof.

An ac voltage source 22 is coupled between electrically conductive members 10 and 18 to supply the appropriate operating voltage which establishes an electric discharge in the laser gas sufficient to invert the population of the energy levels of the desired laser transition. The source 22 generates an ac voltage at an rf frequency of at least about 30 MHz. A coupling circuit 24 applies the ac excitation voltage from the source 22 to the electrode members 10 and 18 and also functions as an impedance-matching network which cancels the reactive impedance of the discharge chamber-defining structure (i.e., the members 10, 14, 16 and 18).

A specific exemplary coupling circuit 24 which may be employed includes a first variable capacitor 26 connected in series with the source 22 and a second variable capacitor 28 connected across the series combination of the source 22 and capacitor 26. One terminal of capacitor 28 is connected to a level of reference potential illustrated as ground, while the inner conductor of a coaxial transmission line 30 is connected between the other terminal of capacitor 28 and a midpoint along the length of the electrode member 18. The outer conductor of coaxial transmission line 30 is grounded and connected to a midpoint along the length of the electrode member 10. As a specific example solely for illustrative purposes, the coaxial transmission line 30 may be an RG 213 line having a characteristic impedance of 50 ohms. It should be understood, however, that other coupling circuits, transmission lines, and impedance values are also suitable and may be employed instead.

Figure 2:
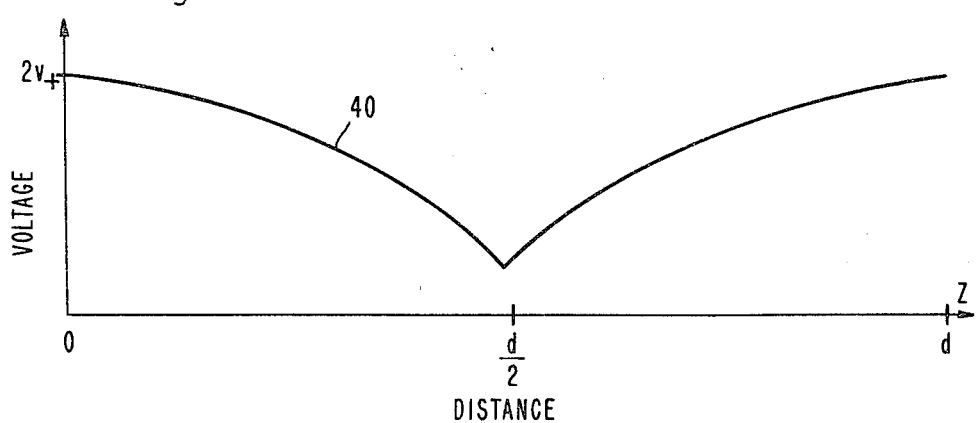
FIG. 2 is a graph illustrating the voltage standing wave pattern as a function of distance along the laser of FIG. 1 but without any inductive loading.

As was indicated above, when the electrical length of a laser according to FIG. 1 is sufficiently large, transmission line effects occur which influence the discharge properties, hence the performance of the laser. Using conventional transmission line analysis, the standing wave voltage V along the length of the laser of FIG. 1 without the inductive loading discussed below is given by $V = 2V_+ \cos \beta z$, where $V_+$ is the magnitude of the voltage forward wave applied between the electrodes 18 and 10, $\beta$ is the transmission line phase constant, and z represents distance along the length d of the laser. An exemplary standing wave voltage pattern for the aforedescribed (uncompensated) condition is illustrated by curve 40 of FIG. 2. As may be seen from FIG. 2, the standing wave voltage V decreases substantially in magnitude from a maximum value at the unterminated ends of the laser to a minimum value midway along the length of the laser where the drive voltage is applied. At the ends of the laser the magnitude of the transmission line reflection coefficient $\rho$ is unity, and the phase angle of the reflection coefficient (which is equal to $=2\beta z$) is zero. The phase of the reflection coefficient $\rho$ reaches its maximum negative value midway along the length of the laser.

In accordance with the present invention, shunt inductance is introduced across a transverse rf pumped waveguide laser to provide a negative admittance which compensates for the variation in the phase angle of the transmission line reflection coefficient along the length of the laser and thereby correspondingly reduces the magnitude of the variation in the standing wave voltage along the length of the laser.

A specific exemplary inductive loading arrangement according to the invention is illustrated in FIG. 1. As shown in FIG. 1 a plurality of inductors 45 are connected between the discharge electrode members 10 and 18 externally of the laser discharge chamber 20 and at respective periodically spaced locations along the length of the chamber 20. In the specific exemplary arrangement illustrated in FIG. 1, six inductors 45 are employed at respective longitudinal locations z=0, d/6, d/3, 2d/3, 5d/6, and d along the length of the laser. However, it should be understood that different numbers of inductances at different locations along the length of the laser are also suitable and may be employed instead. In addition, it is pointed out that individual inductance coils are not required; rather, various equivalent lumped or distributed circuit components may be employed as long as the desired effective inductance is provided at appropriate locations along the length of the laser.

Figure 3:
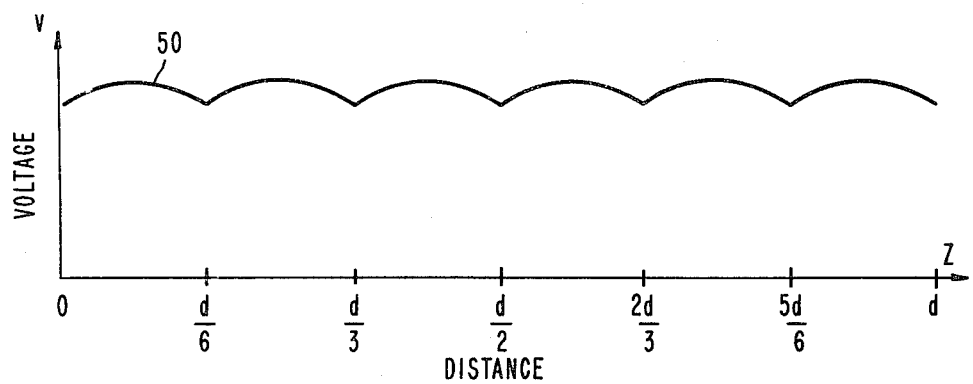
FIG. 3 is a graph showing the voltage standing wave pattern as a function of distance along the laser of FIG. 1 with inductive loading according to the invention.

The voltage standing wave pattern for the laser of FIG. 1 including the shunt inductors 45 is shown by curve 50 of FIG. 3. It may be seen from FIG. 3 that a series of standing wave voltage minima are provided at the respective points of connection of the various inductors 45 as well as at the feed point from the transmission line 30 (i.e., at z=0, d/6, d/3, d/2, 2d/3, 5d/6, and d) along the length of the laser, and standing wave voltage maxima occur midway between respective adjacent pairs of minima. Most significantly, it may be seen that the magnitude of the standing wave voltage variation along the length of the laser is reduced considerably due to of the added shunt inductance.

A specific design example for an inductive loading arrangement according to the invention will now be given to illustrate how the inductance value and number of inductances may be determined. First, for a desired laser length d and excitation frequency f, the characteristic transmission line impedance $Z_o$ and phase constant $\beta$ are determined. For a laser constructed as described above with a length d=21.6 cm and using an excitation frequency f=200 MHz, $Z_o$=61.8 ohms and $\beta$=0.0727 radians per cm. For the aforementioned parameter values the electrical length $\theta = \beta d$ may be calculated to be 120°.

Utilizing the fact that the standing wave voltage in a transmission line varies according to the cosine of $\beta z$, the required $\beta z$ for a maximum allowable variation in the magnitude of the standing wave voltage may be determined. For example, for a maximum standing wave voltage variation of 10%, $\beta z \leq 26°$; while for a maximum standing wave voltage variation of 6%, $\beta z \leq 20°$. To determine the number of inductances required for an allowable standing wave voltage variation, the electrical length $\theta$ of the laser is divided by the maximum allowable $\beta z$ value, and the resulting quotient is rounded up to the next higher integer. Thus, in the example under consideration the number of inductances n = $\theta/\beta z$ = 120°/20° = 6. The electrical distance $\theta_i$ between the inductances is defined as $\theta_i = \theta/n$, and the appropriate inductance value L for all but the end inductances may be calculated from $$L = (Z_o \cot \theta_i)/4\pi f.$$

the end inductance values $L_e$ being given by $L_e=2L$. In the design example under consideration, $\theta_i=20°$, $L=67.6$ nh and $L_e=135.2$ nh.

As was mentioned above, an inductive loading arrangement according to the invention significantly reduces the magnitude of the variation in the standing wave voltage along the length of the laser. This more uniform standing wave voltage results in a more uniform electrical discharge and more efficient pumping of the laser gas. As a result, increased laser operating efficiency and a higher power output may be realized.

Figure 4:
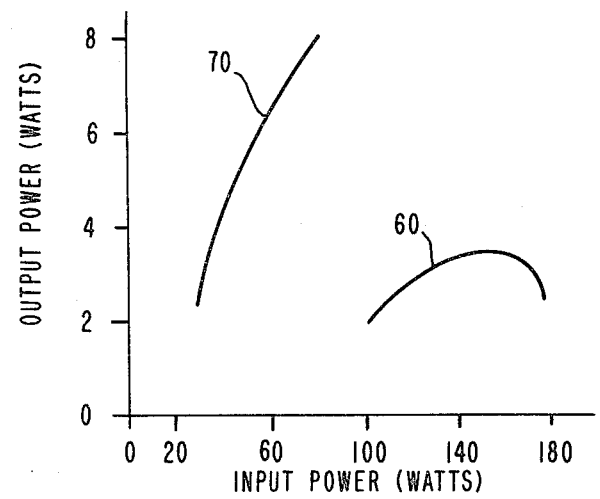
FIG. 4 is a graph showing the laser output power as a function of electrical input power for the laser of FIG. 1 both with and without inductive loading according to the invention.

Increases in output power which have been achieved with a laser according to the invention are depicted in FIG. 4. Curve 60 of FIG. 4 shows the laser output power as a function of electrical input power for the laser of FIG. 1 without inductive loading according to the invention, while curve 70 illustrates the output power from the same laser with the specific exemplary inductive loading described above. It may be seen from curve 60 that the uncompensated laser achieved a maximum output of 3.5 watts for a 160-watt input, an efficiency of 2.2%. However, as shown by curve 70, a laser with inductive loading according to the invention achieved a peak output power of 8.1 watts for 80 watts of input power, an efficiency of over 10%. The maximum efficiency achieved was 11% at an output of 4.4 watts for a 40-watt input. Thus, an increase in output power by a factor of 2.3 and an increase in efficiency by a factor of 5 have been demonstrated to result from the present invention.

The invention also enables transverse rf pumped waveguide lasers of longer physical length to be operated efficiently for a given excitation frequency, or permits higher excitation frequencies to be employed for fixed laser lengths. In addition, only a single electrical feed and minimum circuit hardware and complexity are required.

Although the present invention has been shown and described with reference to a particular embodiment, nevertheless various changes and modifications which are obvious to a person skilled in the art to which the invention pertains are deemed to lie within the spirit, scope, and contemplation of the invention.

What is claimed is:

1. A waveguide laser comprising:
    means defining an elongated chamber of cross-sectional dimensions suitable for guiding laser light and including first and second elongated electrically conductive elements disposed parallel to one another on opposite sides of said chamber;
    a laser gas contained in said chamber;
    means for generating an alternating excitation voltage at a frequency of not less than about 30 MHz and for applying said excitation voltage between said first and second electrically conductive elements to establish a laser-exciting discharge in said laser gas so as to invert the population of the energy levels of the desired laser transition of said gas, said excitation voltage providing in said chamber a standing wave voltage which varies in magnitude along the length of said chamber; and
    inductive means coupled between said first and second electrically conductive elements externally of said chamber for reducing the magnitude of the variation of said standing wave voltage.

2. A waveguide laser according to claim 1 wherein said inductive means includes a plurality of inductances coupled between said first and second electrically conductive elements at periodically spaced locations along said elements.

3. A waveguide laser according to claim 1 wherein said excitation voltage is applied to said first and second electrically conductive elements at a location approximately midway along said elements.

4. A waveguide laser according to claim 3 wherein said inductive means includes a first pair of inductances coupled between said first and second electrically conductive elements at respective locations near the opposite ends of said elements, and at least a second pair of inductances coupled between said elements at respective intermediate locations along said elements.

5. A waveguide laser according to claim 4 wherein the inductance provided by each of said first pair of inductances is approximately equal to twice the inductance provided by each of said second pair of inductances.

* * * * *